US012350739B2

(12) United States Patent
Karlsson

(10) Patent No.: US 12,350,739 B2
(45) Date of Patent: Jul. 8, 2025

(54) ADDITIVE MANUFACTURING APPARATUSES WITH SEPARABLE PROCESS CHAMBER HOUSING PORTIONS AND METHODS OF USE

(71) Applicant: ARCAM AB, Mölndal (SE)

(72) Inventor: Kristofer Karlsson, Kungsbacka (SE)

(73) Assignee: Arcam AB, Mölndal (SE)

( * ) Notice: Subject to any disclaimer, the term of this patent is extended or adjusted under 35 U.S.C. 154(b) by 557 days.

(21) Appl. No.: 16/712,619

(22) Filed: Dec. 12, 2019

(65) Prior Publication Data

US 2021/0178473 A1 Jun. 17, 2021

(51) Int. Cl.
*B22F 10/00* (2021.01)
*B22F 10/28* (2021.01)
(Continued)

(52) U.S. Cl.
CPC ............ *B22F 10/00* (2021.01); *B22F 12/226* (2021.01); *B22F 12/38* (2021.01); *B22F 12/41* (2021.01);
(Continued)

(58) Field of Classification Search
CPC .. B22F 12/38; B22F 3/00; B22F 12/00; B22F 10/20; B22F 10/28; B22F 12/37; B29C 64/25; B29C 64/153; B29C 64/245; B29C 64/255; B29C 64/259; B29C 64/241; B29C 64/165; B65D 43/20; B65D 43/24;
(Continued)

(56) References Cited

U.S. PATENT DOCUMENTS 2,608,344 A 8/1952 Pickels
5,513,777 A 5/1996 Yoda et al.
(Continued)

FOREIGN PATENT DOCUMENTS

DE 19612586 A1 10/1997
DE 102016208196 A1 * 11/2017 ............ B22F 3/1055
(Continued)

OTHER PUBLICATIONS

Espacenet translation of DE 102016208196 A1, Kordass, originally published 2017 (Year: 2017).*

*Primary Examiner* — Seyed Masoud Malekzadeh
*Assistant Examiner* — Jennifer L Groux
(74) *Attorney, Agent, or Firm* — Dinsmore & Shohl LLP

(57) ABSTRACT

An additive manufacturing apparatus includes a process chamber housing enclosing a process chamber. The process chamber housing includes a first separable process chamber housing portion and a second separable process chamber housing portion. The first separable process chamber housing portion includes a top of the process chamber housing and the second separable process chamber housing portion includes a bottom of the process chamber housing. The first separable process chamber housing portion meets the second separable process chamber housing portion at a junction that extends about a periphery of the process chamber housing portion in a closed configuration. The process chamber housing has an open configuration where the first separable process housing portion and the second separable process housing portion are separated to provide an access spacing between the first separable housing portion and the second separable housing portion.

19 Claims, 11 Drawing Sheets

(51) Int. Cl.
  *B22F 12/00* (2021.01)
  *B22F 12/41* (2021.01)
  *B22F 12/52* (2021.01)
  *B33Y 10/00* (2015.01)
  *B33Y 30/00* (2015.01)
  *B33Y 40/00* (2020.01)
  *B22F 10/32* (2021.01)
  *B22F 10/36* (2021.01)
  *B22F 12/57* (2021.01)

(52) U.S. Cl.
  CPC ............... *B33Y 30/00* (2014.12); *B22F 10/28* (2021.01); *B22F 10/32* (2021.01); *B22F 10/36* (2021.01); *B22F 12/52* (2021.01); *B22F 12/57* (2021.01); *B33Y 10/00* (2014.12); *B33Y 40/00* (2014.12)

(58) Field of Classification Search
  CPC . B65D 43/26; B65D 43/12; F16J 13/02; F16J 13/22; B33Y 30/00; B23Q 11/08; B23Q 2011/0808; B23Q 37/005; B23Q 37/007; B65H 2402/441; B01L 1/00; B05C 15/00
  See application file for complete search history.

(56) References Cited

U.S. PATENT DOCUMENTS

| | | | |
|---|---|---|---|
| 5,565,058 A | 10/1996 | Banholzer et al. | |
| 5,833,092 A | 11/1998 | Godfrey et al. | |
| 6,050,446 A * | 4/2000 | Lei | H01L 21/67017 220/264 |
| 6,565,662 B2 * | 5/2003 | Amano | H01L 21/67069 156/345.55 |
| 8,366,370 B2 | 2/2013 | Nakamura et al. | |
| 8,485,399 B2 | 7/2013 | Raz | |
| 8,641,820 B2 | 2/2014 | Anttila et al. | |
| 8,783,331 B2 | 7/2014 | Heinecke et al. | |
| 8,955,558 B2 | 2/2015 | Bosveld et al. | |
| 9,486,962 B1 | 11/2016 | Dugan et al. | |
| 9,573,225 B2 | 2/2017 | Buller et al. | |
| 9,594,368 B2 | 3/2017 | Kronenberg et al. | |
| 9,956,726 B2 | 5/2018 | Okamoto et al. | |
| 9,969,527 B2 | 5/2018 | Smith et al. | |
| 10,046,412 B2 | 8/2018 | Blackmore | |
| 10,168,693 B2 | 1/2019 | Kingston et al. | |
| 2006/0108712 A1 * | 5/2006 | Mattes | B33Y 10/00 425/375 |
| 2011/0223349 A1 | 9/2011 | Scott | |
| 2015/0158248 A1 * | 6/2015 | Huang | B29C 64/25 425/161 |
| 2016/0311164 A1 | 10/2016 | Miyano | |
| 2017/0144874 A1 * | 5/2017 | Huebinger | B22F 12/88 |
| 2017/0252806 A1 * | 9/2017 | Wienberg | B33Y 50/02 |
| 2017/0304153 A1 | 10/2017 | Williamson et al. | |
| 2017/0369205 A1 | 12/2017 | Giulietti et al. | |
| 2018/0001557 A1 * | 1/2018 | Buller | B29C 64/255 |
| 2018/0099332 A1 * | 4/2018 | Shaw | B22F 3/003 |
| 2018/0193918 A1 * | 7/2018 | Griffith | G05B 19/4099 |
| 2018/0211893 A1 | 7/2018 | Ichino et al. | |
| 2018/0250835 A1 * | 9/2018 | Stammberger | B29C 64/153 |
| 2018/0304367 A1 | 10/2018 | Myerberg et al. | |
| 2018/0354035 A1 * | 12/2018 | Sun | B22F 7/02 |
| 2019/0022938 A1 * | 1/2019 | Winiarski | B22F 10/28 |
| 2019/0039135 A1 * | 2/2019 | Hollahan | B22F 12/67 |
| 2019/0105837 A1 | 4/2019 | Zehavi et al. | |
| 2019/0263064 A1 * | 8/2019 | Von Burg | B29C 64/227 |
| 2020/0139623 A1 * | 5/2020 | Kalpio | B22F 12/88 |
| 2021/0096535 A1 * | 4/2021 | Wigand | B29C 64/118 |
| 2021/0170675 A1 * | 6/2021 | Kanerva | B33Y 30/00 |

FOREIGN PATENT DOCUMENTS

| | | | |
|---|---|---|---|
| WO | WO-2019031979 A1 * | 2/2019 | |
| WO | WO-2020198050 A1 * | 10/2020 | ........... B22D 23/003 |

\* cited by examiner

ADDITIVE MANUFACTURING APPARATUSES WITH SEPARABLE PROCESS CHAMBER HOUSING PORTIONS AND METHODS OF USE

BACKGROUND

Field

The present specification generally relates to additive manufacturing apparatuses and, more specifically, to additive manufacturing apparatuses with separable process chamber housing portions and methods for using the same.

Technical Background

Additive manufacturing apparatuses may be utilized to "build" an object from build material, such as organic or inorganic powders, in a layer-wise manner. Early iterations of additive manufacturing apparatuses were used for prototyping three-dimensional objects. While there is an increased interest in utilizing additive manufacturing apparatuses for large-scale commercial production of objects, there continues to be a need for smaller additive manufacturing apparatuses for prototyping. One issue with relatively small additive manufacturing apparatuses is limited access to within process chambers of the additive manufacturing apparatuses due to the small size of any access doors or windows and generally the reduced volume within the process chambers.

Accordingly, a need exists for alternative additive manufacturing apparatuses that include separable process chamber housing portions in order to provide greater access to within the process chambers for cleaning and other operations.

SUMMARY

In a first embodiment, an additive manufacturing apparatus for forming a three-dimensional article through successive fusion of parts of layers of a powder material, which parts correspond to successive cross-sections of the three-dimensional article is provided. The additive manufacturing apparatus includes a process chamber housing enclosing a process chamber. The process chamber housing includes a first separable process chamber housing portion and a second separable process chamber housing portion. The first separable process chamber housing portion includes a top of the process chamber housing and the second separable process chamber housing portion includes a bottom of the process chamber housing. The first separable process chamber housing portion meets the second separable process chamber housing portion at a junction that extends about a periphery of the process chamber housing portion in a closed configuration. The process chamber housing has an open configuration where the first separable process housing portion and the second separable process housing portion are separated to provide an access spacing between the first separable housing portion and the second separable housing portion.

In a second embodiment, a process chamber housing for an additive manufacturing apparatus for forming a three-dimensional article through successive fusion of parts of layers of a powder material, which parts correspond to successive cross-sections of the three-dimensional article is provided. The process chamber housing includes a first separable process chamber housing portion and a second separable process chamber housing portion. The first separable process chamber housing portion includes a top of the process chamber housing and the second separable process chamber housing portion comprising a bottom of the process chamber housing. The first separable process chamber housing portion meets the second separable process chamber housing portion at a junction that extends about a periphery of the process chamber housing portion in a closed configuration. The process chamber housing has an open configuration where the first separable process housing portion and the second separable process housing portion are separated to provide an access spacing between the first separable housing portion and the second separable housing portion In another embodiment, a method of accessing a process chamber of an additive manufacturing apparatus is provided. The method includes building a three-dimensional article on a build platform within a process chamber of a process chamber housing through successive fusion of parts of layers of a powder material, which parts correspond to successive cross-sections of the three-dimensional article. A first separable process chamber housing portion and a second separable process chamber housing portion of the process chamber are separated at a junction that extends about a periphery of the process chamber housing to provide an access spacing between the first separable process chamber housing and the second separable process chamber housing and thereby place the process chamber housing in an open configuration. The first separable process chamber housing portion includes a top of the process chamber housing and the second separable process chamber housing portion includes a bottom of the process chamber housing.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
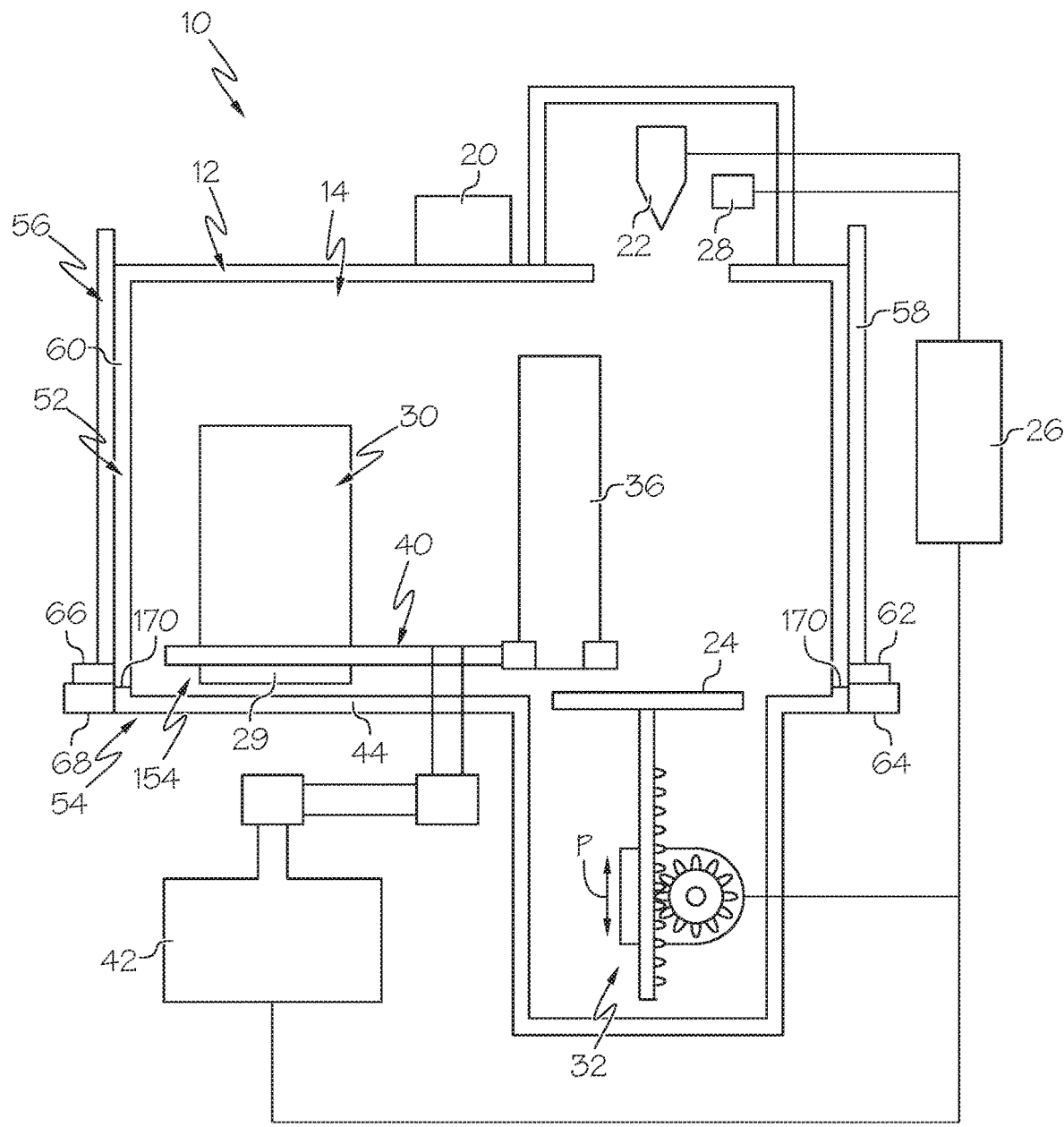
FIG. 1 is a schematic view of an additive manufacturing apparatus, according to one or more embodiments shown and described herein.

Whenever possible, the same reference numerals will be used throughout the drawings to refer to the same or like parts. One embodiment of an additive manufacturing apparatus includes separable process chamber housing portions in order to provide greater access to within the process chambers for cleaning and other operations where access to within the process chamber is needed. Another embodiment of an additive manufacturing apparatus includes a powder storage vessel having a closed configuration where metal powder is inhibited from leaving the powder storage vessel and an open configuration where metal powder is allowed to leave the powder storage vessel. Various embodiments of additive manufacturing apparatuses, additive manufacturing apparatuses including the separable process chambers and/or the powder storage vessels, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower,—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Reference will now be made in detail to embodiments of additive manufacturing apparatuses, and components thereof, examples of which are illustrated in the accompanying drawings. The additive manufacturing apparatuses may include a process chamber housing that houses a build platform onto which a powder material is delivered and an electron beam source that is used to fuse powder together layer-by-layer. A powder storage vessel is provided in the process chamber that can be delivered to the build platform to dispense the powder material thereon. A rotatable support conveyor may be used to both hold the powder storage vessel and also to move the powder storage vessel toward and away from the build platform as layers of fused powder material are being formed.

As can be appreciated, powder material may build up in and may need to be cleaned from the process chamber from time-to-time. To facilitate access to the process chamber for cleaning or any other reason, the process chamber housing is divided into process chamber housing portions including a first process chamber housing portion and a second process chamber housing portion, where the first and second process chamber housing portions are separable from one another to provide increased access to within the process chamber.

As used herein, the term "three-dimensional structures" and the like refer generally to intended or actually fabricated three-dimensional configurations (e.g., of structural material or materials) that are intended to be used for a particular purpose. Such structures may be, for example, designed with the aid of a computer aided design (CAD) program.

As used herein, the term "two-dimensional structures" and the like refer generally to layers of the three-dimensional structure that when built, one over the other, form the three-dimensional structures. While referred to as "two-dimensional structures," it should be understood that each layer includes an accompanying thickness in a third dimension, albeit the structures have a relatively planar configuration compared to a fused stack of the two-dimensional structures that form the three-dimensional structures.

As used herein, the term "electron beam" refers to any charged particle beam. The sources of a charged particle beam can include an electron gun, a linear actuator, etc.

Various embodiments of the additive manufacturing apparatuses relate to methods for producing three-dimensional objects by layering two-dimensional structures one on the other by powder additive manufacturing, such as using electron beam melting (EBM), selective laser sintering (SLS) and/or selective laser melting (SLM).

Referring to FIG. 1, an additive manufacturing apparatus 10 includes a process chamber housing 12 defining a process chamber 14 that includes a first process chamber housing portion 52 and a second process chamber housing portion 54. A vacuum system 20 may be provided that provides a vacuum within the process chamber 14. The vacuum system 20 is capable of maintaining a vacuum environment within the process chamber 14. The vacuum system 20 may include, for example, a turbomolecular pump, a scroll pump, an ion pump and one or more valves that controls ingress and egress or air and/or other gases into and out of the process chamber 14 through the vacuum system 20. In some embodiments, the process chamber 14 may be back filled with another gas other than air, such as helium.

An electron beam gun 22 generates an electron beam that is used for melting or fusing together powder material provided on a build platform 24. A control unit 26 is provided for controlling and managing the electron beam gun 22 and the electron beam that is emitted. The control unit 26 may include a processor and memory for storing a CAD program and CAD design that can be executed by the processor. A focusing coil, deflection coil, astigmatic coil and an electron beam power supply (all represented by element 28) may be electrically connected to the control unit 26. In some embodiments, the electron beam gun 22 generates a focusable electron beam with an accelerating voltage of between about 15 kV and 120 kV and with a beam power of between about three Kw and about 10 kW. The pressure in the process chamber may be about $1 \times 10^{-3}$ mbar or lower when building the three-dimensional structure by fusing the powder layer-by-layer with the electron beam.

In another embodiment, a laser beam may be used for melting or fusing the powder material. In such a case, tiltable mirrors may be used in the beam path in order to deflect the laser beam to a predetermined position. As used herein, a laser beam, electron beam or any other energy suitable in building a three-dimensional structure as discussed herein may be referred to as an energy beam.

A powder storage vessel 30 houses the powder material to be provided on the build platform 24. The powder material may be, for example, pure metals or metal alloys, such as titanium, titanium alloys, aluminum, aluminum alloys, stainless steel, Co—Cr alloys, nickel based super alloys, etc. Additional details of the powder storage vessel are described below.

A powder distributor 29 is arranged to rake a thin layer of powder material that falls from the powder storage vessel 30 onto the build platform 24. During a work cycle, the build platform 24 is lowered successively in relation to a fixed point in the process chamber 14. In order to make this movement possible, the build platform 24 can translate in a vertical direction, i.e., in the direction indicated by arrow P. This means that the build platform 24 starts in an initial position, in which a first powder material layer of necessary thickness is laid down. An actuation system 32 is provided that lowers and then raises the build platform 24. The actuation system 32 may, for example, include any suitable linear actuator.

The energy beam may be directed over the build platform 24 causing a first powder layer to fuse in selected locations to form a first cross-section of the three-dimensional structure. The energy beam is directed over the build platform 24 in accordance with instructions given by the control unit 26. In the control unit 26, instructions for how to control the electron beam for each layer of the three-dimensional structure is stored in memory.

After a first layer is finished, i.e., the fusion of powder material for making a first layer of the three-dimensional structure, a second powder layer is provided on the build platform 24. The second powder layer is distributed according to the same manner as the previous layer in some embodiments. However, there may be other methods in the same additive manufacturing machine for distributing powder onto the build platform 24.

After having distributed the second powder layer on the build platform 24, the energy beam is directed over the build platform 24 causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also re-melting at least a fraction of a thickness of a layer directly below the uppermost layer.

In some embodiments, a shield 36 (e.g., formed of stainless steel) may be provided between the build platform 24 and the powder storage vessel 30. The shield 36 may inhibit heated metal powders from sputtering into the process chamber 14.

A rotatable support conveyor 40 may be used to both hold the powder storage vessel 30 and also to move the powder storage vessel 30 toward and away from the build platform 24 as layers of fused powder material are being formed. A motor 42 may be provided that is used to rotate the rotatable support conveyor 40 based on instructions from the control unit 26. After each layer of material is formed, the control unit 26 instructs the motor 42 to rotate the rotatable support conveyor 40, which moves both the powder storage vessel 30 and the powder distributor 29 that is underneath the powder storage vessel 30 toward the build platform 24. At onset of an additive manufacturing process, the build platform 24 may be below a floor 44 of the process chamber housing 12 a predetermined amount (e.g., about 20-100 µm per layer). This allows a layer of powder material of a predetermined thickness to be raked over the build platform 24. The rotatable support conveyor 40 then returns the powder storage vessel 30 to its initial position while the electron beam gun 22 fuses the powder material in a predetermined pattern.

The layer of powder material provided on the build platform 24 may have a working diameter of about 100 mm or less. The build platform 24 may move down in the direction P a total distance of about 100 mm or less thereby capable of building a 100 mm×100 mm×100 mm three-dimensional structure. In this regard, the additive manufacturing apparatus 10 may be referred to as compact. As used herein, the term "compact additive manufacturing apparatus" refers to additive manufacturing apparatuses having a working area (i.e., area of the build platform 24) of no greater than about 785 cm$^2$ for a working area having a diameter of 100 mm. While the work area is shown as circular herein, the work area may be any suitable shape, such as rectangular, irregular, or any other suitable shape. In some embodiments, the compact additive manufacturing apparatuses may be defined by the size of the process chamber, which may be no greater than about 31400 cm$^3$.

Because the size of additive manufacturing apparatus 10 may be relatively small, the additive manufacturing apparatus may be provided with separable process chamber housing portions, such as a first separable process chamber housing portion 52 and a second separable process chamber housing portion 54. The process chamber housing 12 may be separable so that an operated does not have to rely on presence of an openable door of limited area to enter into the process chamber 14, for example, for a cleaning operation or to exchange components, such as the powder storage vessel 30. An actuation device 56 is connected to one or both of the first and second separable process chamber housing portions 52 and 54. The actuation device 56 may include any suitable guide member, such as a guide member that includes a first linear actuator 58 and a second linear actuator 60 on a side of the process chamber housing 12 that is opposite the first linear actuator 58. The first linear actuator 58 includes a first housing connection 62 that is connected to the first process chamber housing portion 52 and a second housing connection 64 that is connected to the second process chamber housing portion 54. Likewise, the second linear actuator 60 includes a first housing connection 66 that is connected to the first process chamber housing portion 52 and a second housing connection 68 that is connected to the second process chamber housing portion 54. Additional details of the separable process chamber housing portions 52 and 54 are described in greater detail below.

Powder Storage Vessel

Figure 2:
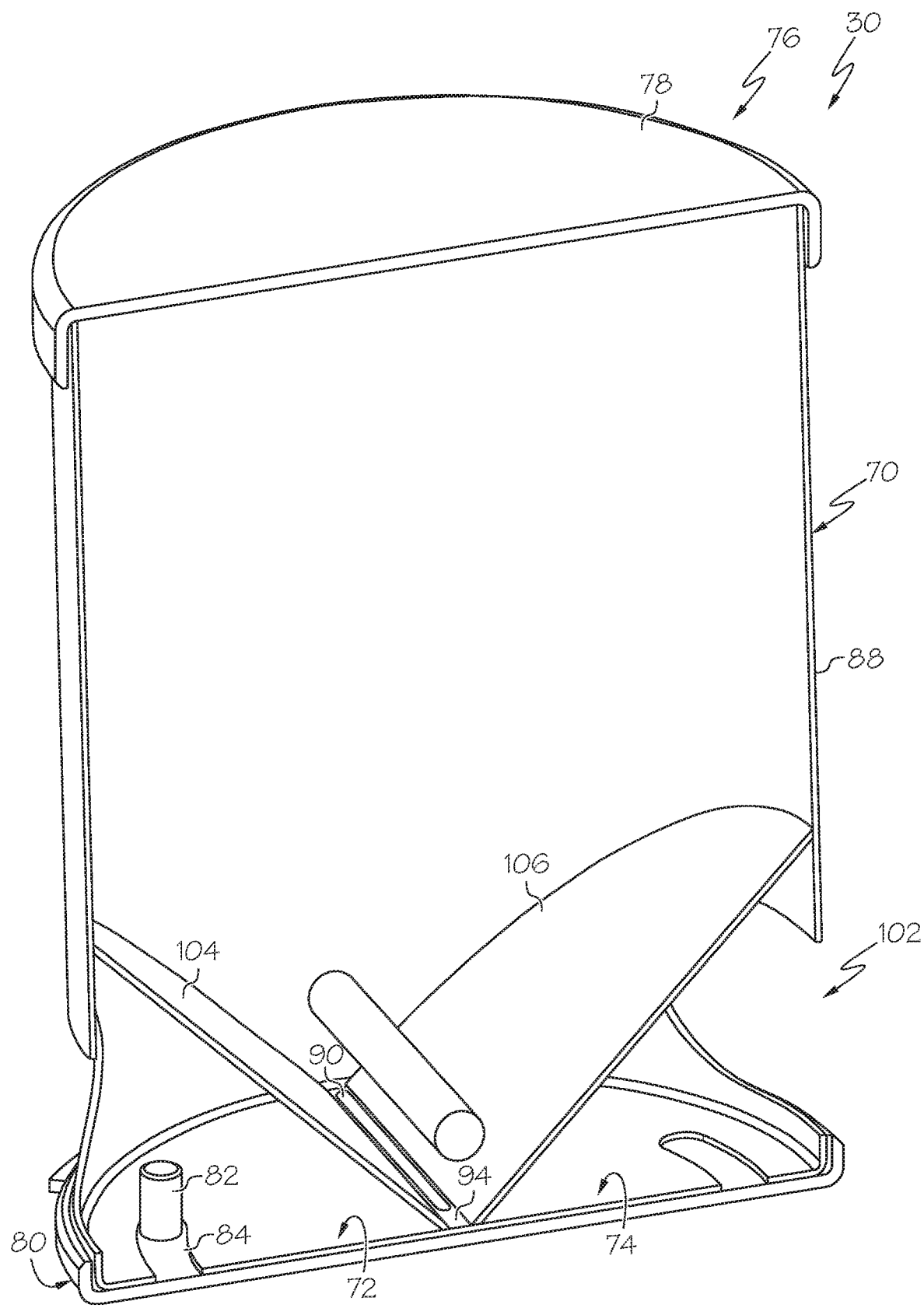
FIG. 2 is a section view of a powder storage vessel for use with the additive manufacturing apparatus of FIG. 1, according to one or more embodiments shown and described herein.
Figure 3:
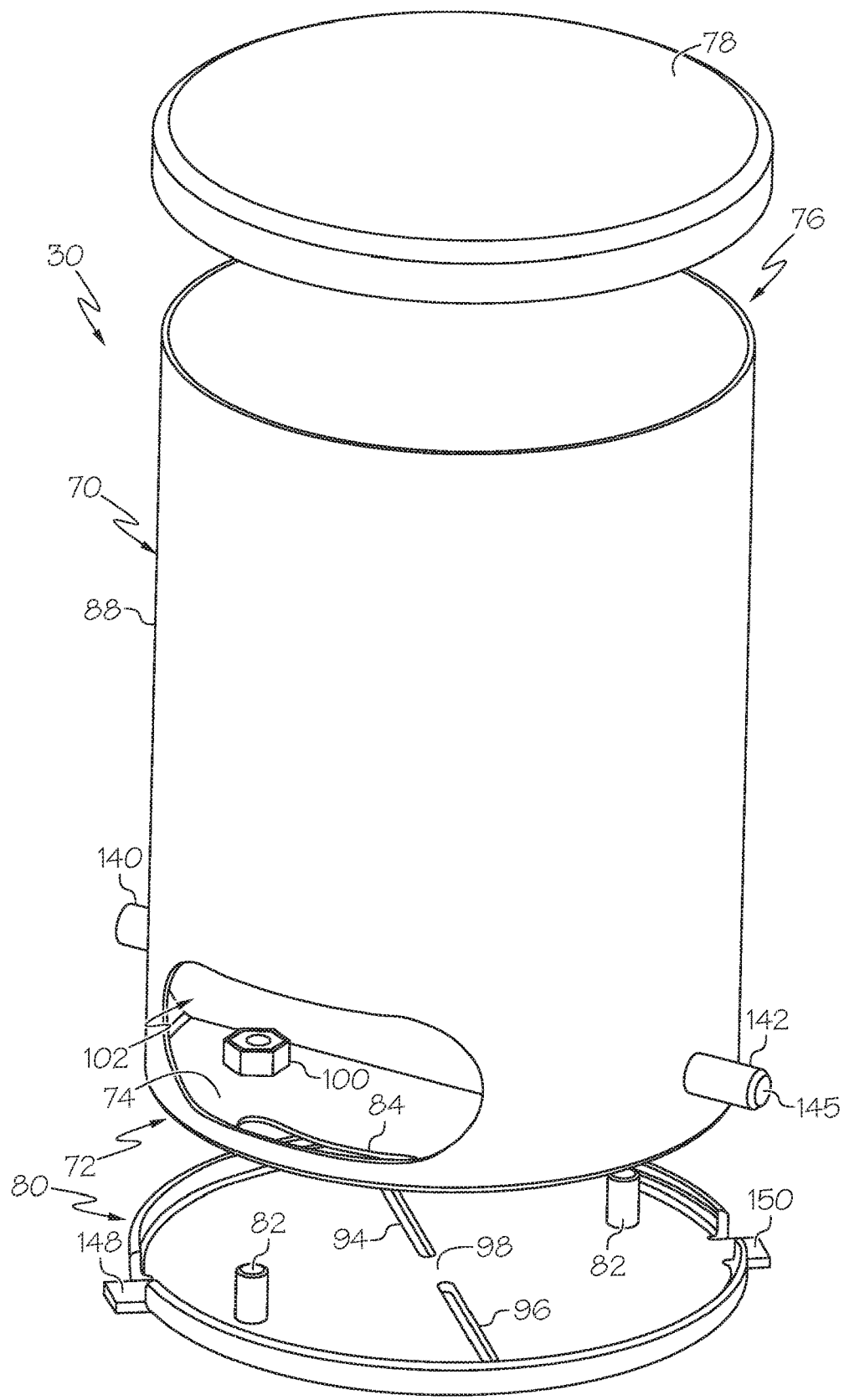
FIG. 3 is a perspective, exploded view of the powder storage vessel of FIG. 2, according to one or more embodiments shown and described herein.

Referring to FIG. 2 where a section view of the powder storage vessel 30 is shown and also to FIG. 3 where a perspective exploded view of the powder storage vessel 30 is illustrated. The powder storage vessel 30 includes a vessel body 70 that, in the illustrated embodiment, is generally cylindrical having a width or diameter and a height. The vessel body 70 has a bottom 72 with a floor 74 that is primarily closed and a top 76 that may be open-ended. A sidewall 88 extends between the top 76 and the bottom 72. A top cap 78 may be used to close the top 76. A bottom cap 80 may be used to cover the bottom 72 and the floor 74. The bottom cap 80 includes guide pins 82, which may be threaded, that can be received within guide slots 84 within the floor 74. The guide slots 84 are elongated in a circumferential direction and are located nearer to the sidewall 88 than to a central axis of the vessel body 70.

The floor 74 has a pair of powder delivery slots 90 and 92 (see FIG. 4) that have elongated dimensions that extend in a radial direction. The powder delivery slots 90 and 92 may be spaced-apart from one another providing a gap 97 at a center of the floor 74. The bottom cap 80 also includes powder delivery slots 94 and 96 that have elongated dimensions that extend in the radial direction. The powder delivery slots 94 and 96 may be spaced apart from one another providing a gap 98 at a center of the bottom cap 80. The powder delivery slots 94 and 96 and the powder delivery slots 90 and 92 may have substantially the same dimensions in both the radial and circumferential directions.

Figure 4:
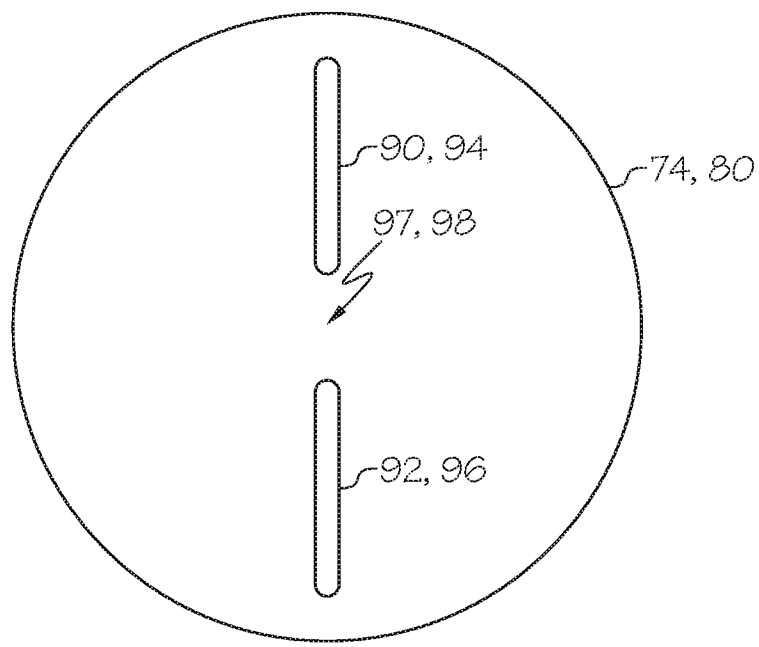
FIG. 4 is a schematic plan view of operation of a bottom cap of the powder storage vessel of FIG. 2 in an open configuration, according to one or more embodiment shown and described herein.
Figure 5:
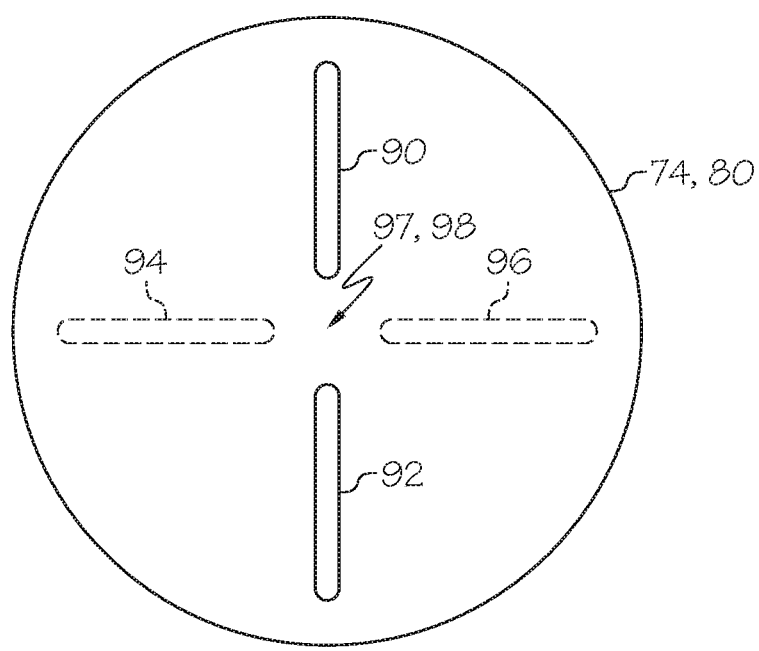
FIG. 5 is a schematic plan view of operation of the bottom cap of FIG. 4 in a closed configuration, according to one or more embodiments shown and described herein.

The bottom cap 80 can rotate relative to the vessel body 70 to place the powder storage vessel 30 in the open configuration or the closed configuration. Referring particularly to FIG. 4, in the open configuration, the powder delivery slots 94 and 96 of the bottom cap 80 align with the powder delivery slots 90 and 92 of the floor 74 of the vessel body 70, which allows powder material to exit the powder storage vessel 30. As represented by FIG. 5, rotating the vessel body 70 and/or the bottom cap 80 relative to each other places the powder delivery slots 90 and 92 of the floor 74 of the vessel body 70 out of alignment with the powder delivery slots 94 and 96 of the bottom cap 80, which disallows powder material from exiting the powder storage vessel 30. Shown by FIG. 3, a lock member 100 (e.g., a nut) may be provided that can be connected to the guide pins 82 and used to lock the powder storage vessel either in the closed or open configurations. Access openings 102 may be provided through the sidewall 88 that provides access to the lock member 100 for tightening or loosening operations in order to allow or disallow rotation of the vessel body 70 and bottom cap 80 relative to one another.

Referring again to FIG. 2, the powder storage vessel 30 is provided with guide walls 104 and 106 that extend downward from the sidewall 88 toward the floor 74 forming a funnel-like shape. The guide walls 104 and 106 terminate at opposite edges of the powder delivery slots 90 and 92. The guide walls 104 and 106 utilize gravity to reliably deliver powder material to the powder delivery slots 90 and 92.

Figure 6:
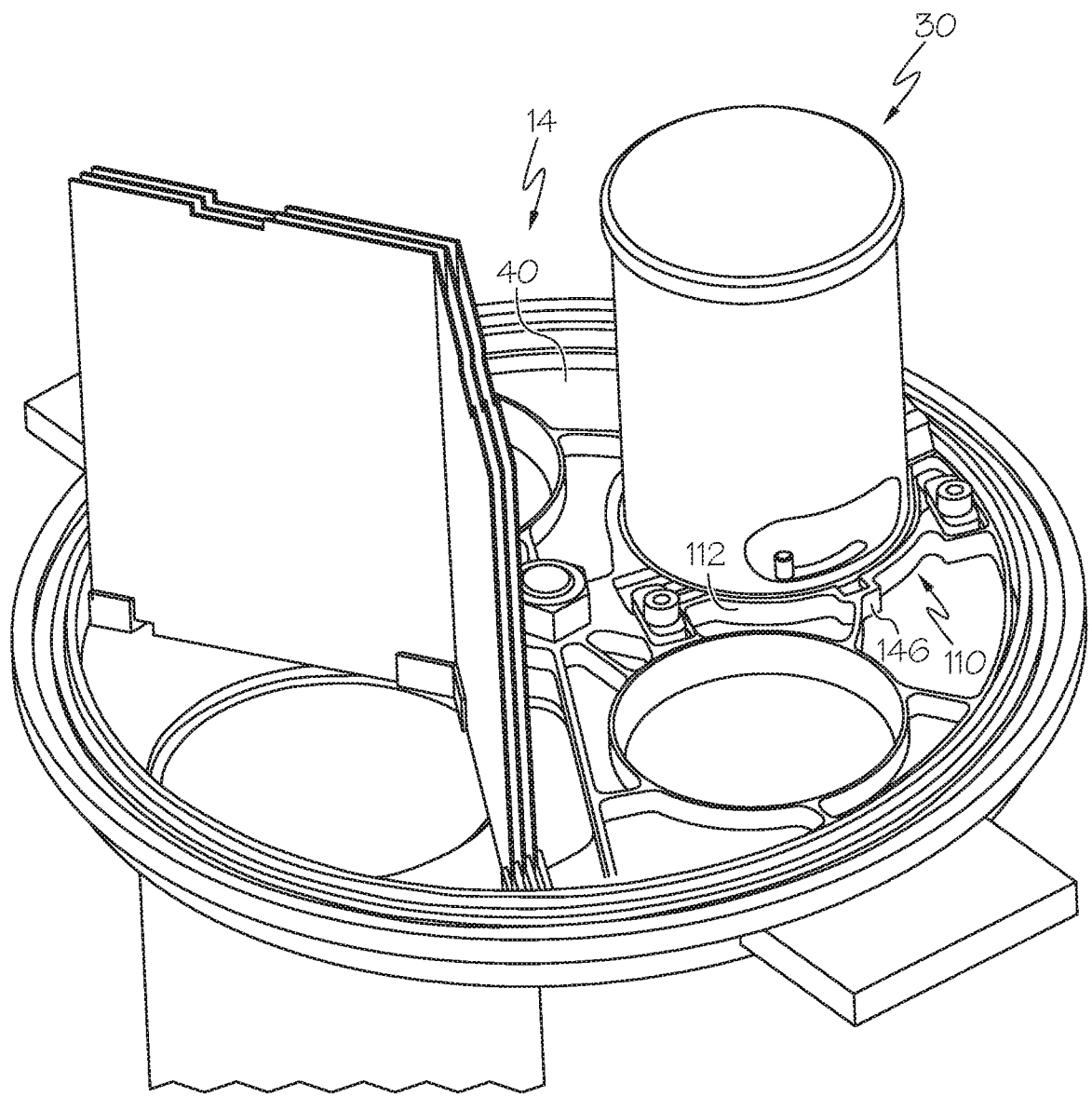
FIG. 6 is a perspective view of the additive manufacturing apparatus of FIG. 1 with a separable process housing portion removed showing the powder storage vessel of FIG. 2, according to one or more embodiments shown and described herein.

Referring now to FIG. 6, the interior of the process chamber 14 including the powder storage vessel 30 with the separable process housing portion 52 removed for clarity is illustrated. The powder storage vessel 30 is received by a cavity structure 110 that is provided in the rotatable support conveyor 40. A support wall 112 surrounds a perimeter of the cavity structure 110 to provide additional support for the powder storage vessel 30. Referring also to FIG. 6, a raised support ledge 114 is provided about the perimeter of the cavity structure 110 and is raised from a floor 116 of the cavity structure 110 providing some clearance between the powder storage vessel 30 and the floor 116 when located thereon. A central raised ledge 118 extends radially through the cavity structure 110 and includes a slot 120 that also extends radially along the central raised ledge 118. The slot 120 aligns with the powder delivery slots 90, 92, 94 and 96 of the powder storage vessel 30 with the powder storage vessel 30 in the open configuration.

Figure 7:
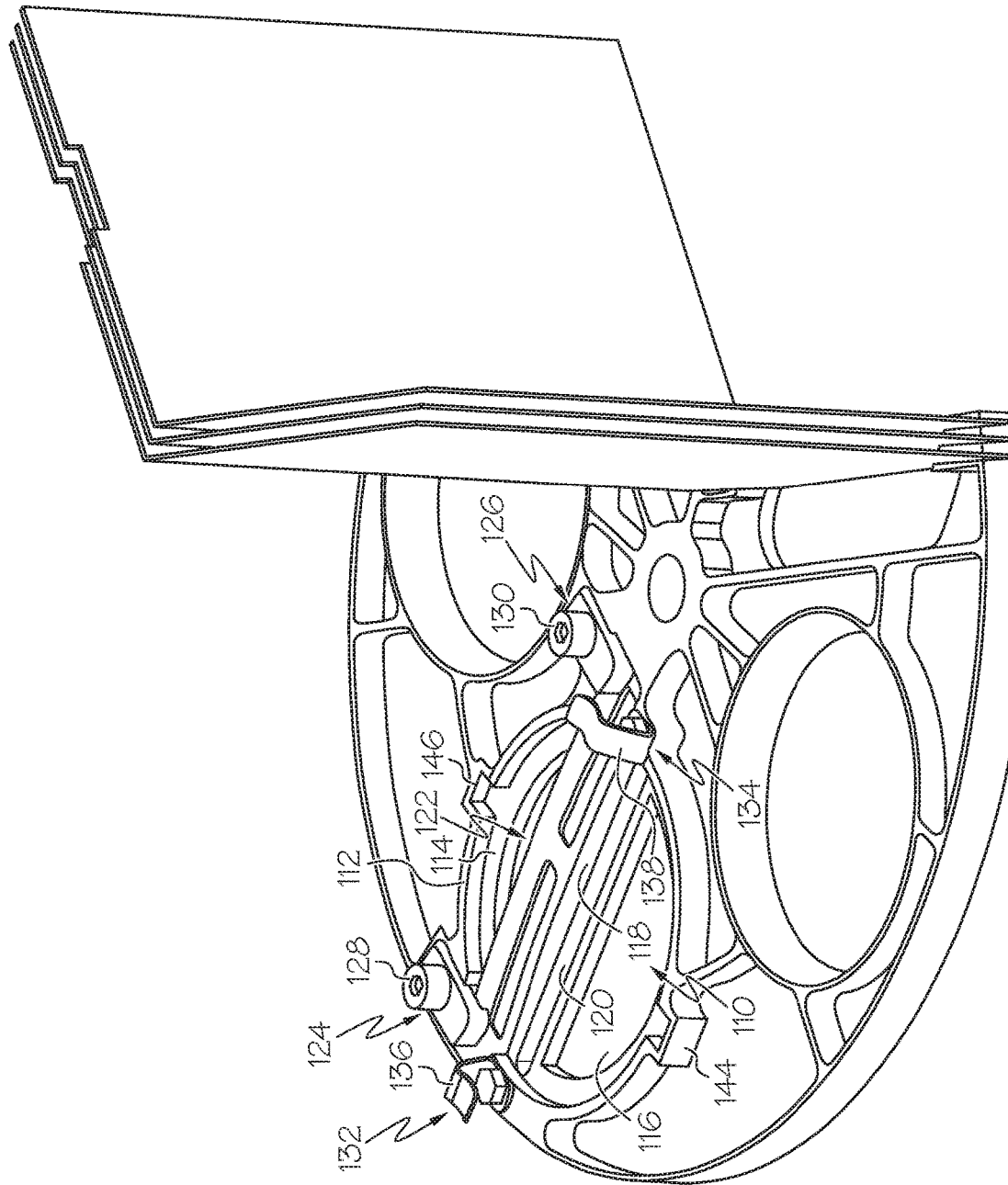
FIG. 7 is a perspective view of the additive manufacturing apparatus of FIG. 6 with the powder storage vessel removed, according to one or more embodiments shown and described herein.

As shown most clearly by FIG. 7, a vessel support bracket 122 is mounted at least partially within the cavity structure 110. The vessel support bracket 122 includes mounts 124 and 126 that mount the vessel support bracket 122 to the rotatable support conveyor 40 using fasteners 128 and 130. A pair of clips 132 and 134 are mounted adjacent the vessel support bracket 122. In some embodiments, the clips 132 and 134 may be part of the vessel support bracket 122. The clips 132 and 134 include oppositely oriented U-shaped clip portions 136 and 138 that receive opposite ends 140 and 142 of a dowel rod 145 (FIG. 3) that extends through and is fixedly connected to the vessel body 70.

The cavity structure 110 further includes tab receiving recesses 144 and 146. The tab receiving recesses 144 and 146 are located on opposite sides of the cavity structure 110 and are oriented about 90 degrees offset from the clip portions 136. As can be seen in FIG. 3, the bottom cap 80 includes tabs 148 and 150. The tabs 148 and 150 are located on opposite sides of the bottom cap 80. The tabs 148 and 150 are sized and located to be received within the tab receiving recesses 144 and 146. When the tabs 148 and 150 are located within the tab receiving recesses 144 and 146 and the ends 140 and 142 of the dowel rod 140 are received by the clip portions 136 and 138, the powder storage vessel 30 is placed in the open configuration and powder material flows through the slots 90, 92, 94 and 96 and passes through the slot 120 into a space 154 beneath the rotatable support conveyor 40 and adjacent the powder distributor 29 (FIG. 1). The space 154 may have a height of between about five mm and about 6 mm, for example.

Figure 8:
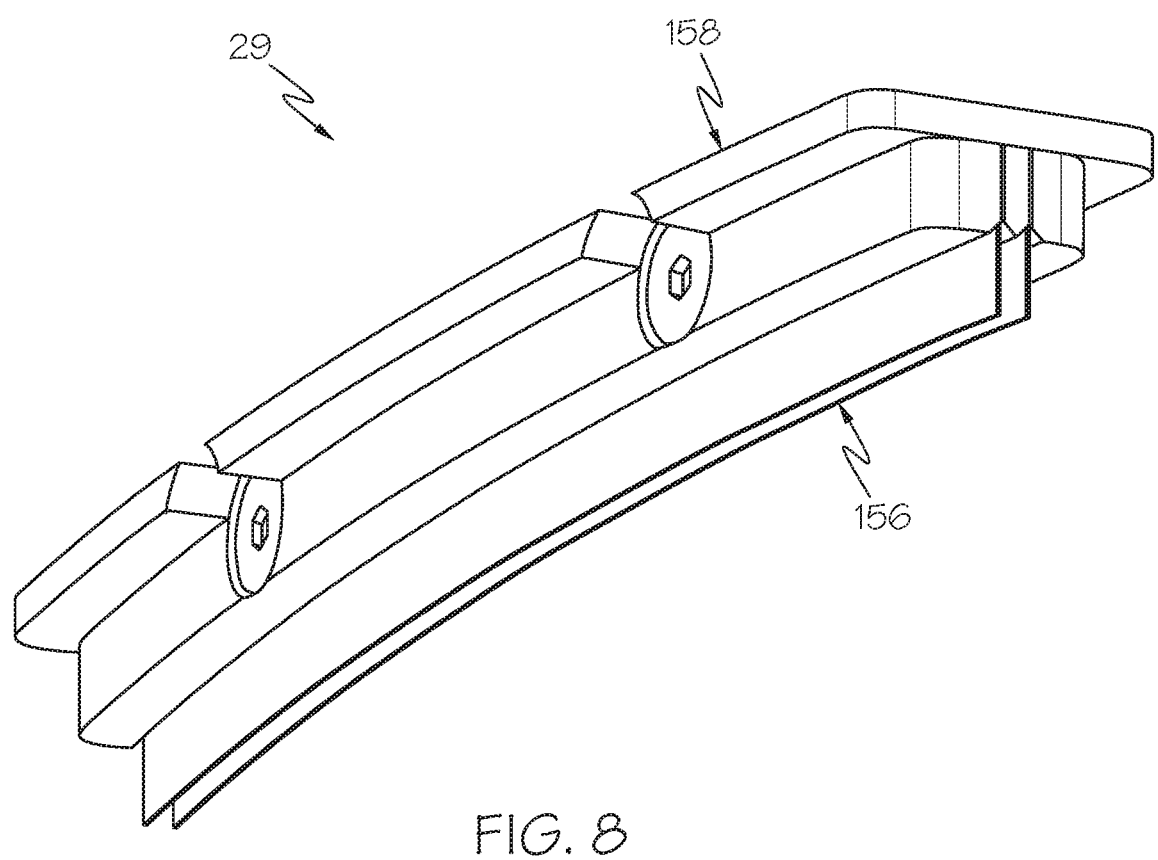
FIG. 8 is a perspective view of a powder distributor, according to one or more embodiments shown and described herein.
Figure 9:
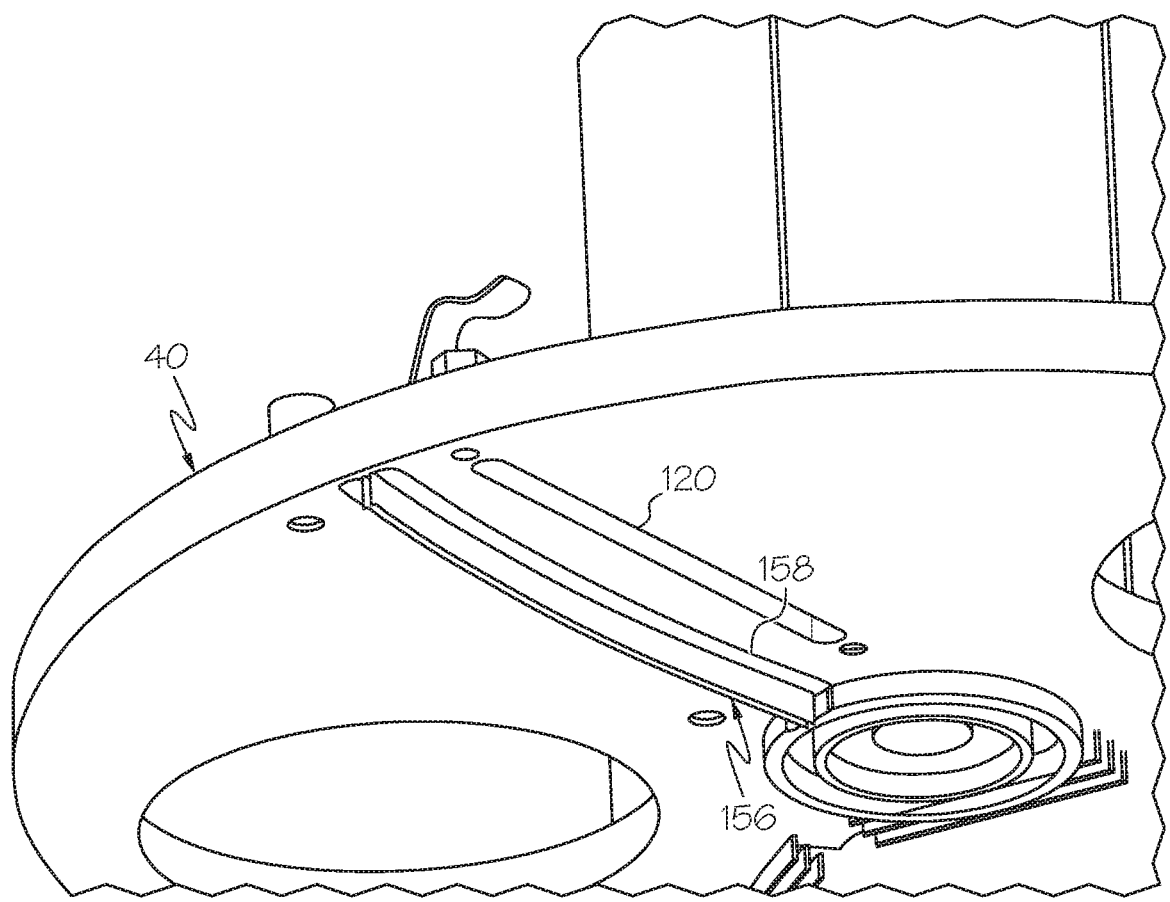
FIG. 9 is a bottom view of a rotatable support conveyor of the additive manufacturing apparatus of FIG. 7 with the powder distributor of FIG. 8, according to one or more embodiments shown and described herein.

Referring briefly to FIGS. 8 and 9, the powder distributor 29 includes a relatively flexible rake portion 156 and a relatively rigid connecting portion 158. The relatively rigid connecting portion 158 mounts to an underside of the rotatable support conveyor 40 such that powder material can be carried by the rake portion toward the build platform 24.

The powder distributor 29 mounts at a location adjacent the slot 120 to push the powder material toward the build platform 24 as the rotatable support conveyor 40 rotates. In some embodiments, the powder distributor 29 may be curved in the direction of its long axis; however, the powder distributor 24 may be straight in other embodiments.

Separable Process Chamber Housing

Figure 10:
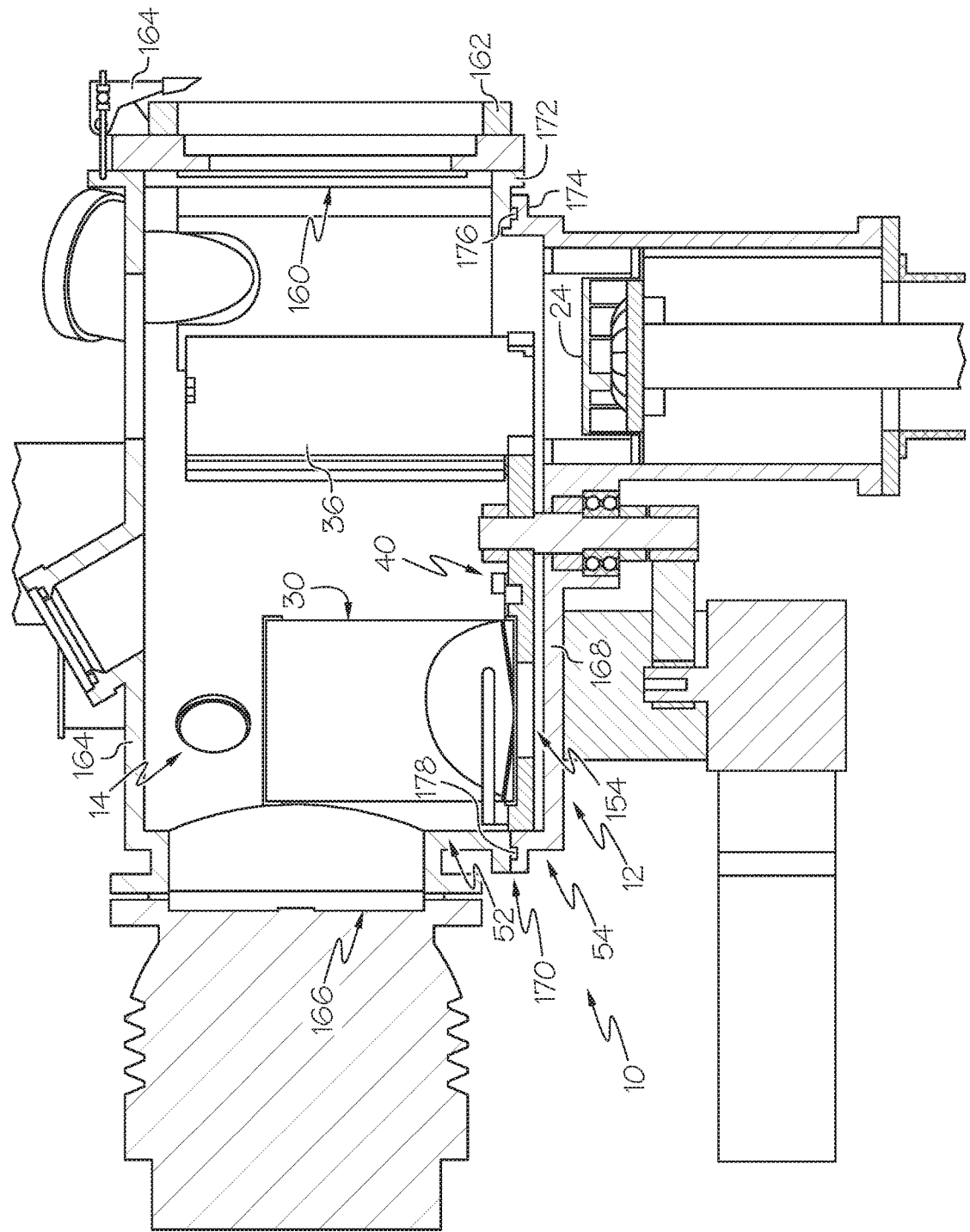
FIG. 10 is a section view of the additive manufacturing apparatus of FIG. 1 with a separable process chamber housing in a closed configuration, according to one or more embodiments shown and described herein.

Referring to FIG. 10, a section view of the additive manufacturing apparatus 10 is illustrated including the process chamber housing 12 defining the process chamber 14, the rotatable support conveyor 40, the powder storage vessel 30, the shield 36 and the build platform 24. As discussed above, the space 154 is provided beneath the rotatable support conveyor 40 where a limited amount of powder material can accumulate from the powder storage vessel 30 and then be pushed by the powder distributor 29 (not shown) to the build platform 24.

As noted above, the size of the process chamber housing 12 may be relatively small. Because of this, it may be difficult to access all areas of the process chamber 14 through an access opening 160 provided at a front of the process chamber housing 12. For example, the access opening 160 may have a height/width/diameter that is less than about 500 mm, such as less than about 250 mm, such as less than about 200 mm, such as less than about 175 mm, such as less than about 150 mm. A door 162 may be provided that closes the access opening 160. The door 162 may include a latch 164 that allows for latching and unlatching the door 162 to the process chamber housing 12. An average human hand breadth where the fingers meet the palm may be about 80 mm for illustrative purposes. It can be appreciated that reaching into the process chamber 14 through the access opening 160 may be somewhat cumbersome.

The process chamber housing 12 includes the first separable process chamber housing portion 52 and the second separable process chamber housing portion 54. The first separable process chamber housing portion 52 includes a top 164 of the process chamber housing 12 and at least a portion of a side 166 of the process chamber housing 12. The second separable process chamber housing portion 54 includes a bottom 168 of the process chamber housing 12 and may include a portion of the side 166 of the process chamber housing 12. The first separable process chamber housing portion 52 meets the second separable process chamber housing portion 54 at a junction 170. The junction 170 is formed between a first flange 172 at a terminal end of the first separable process chamber housing portion 52 and a second flange 174 at a terminal end of the second separable process chamber housing portion 54. A seal 176 (e.g., an O-ring seal) may be provided within a recess 178 between the first and second flanges 172 and 174. The seal 176 may be provided to help maintain an air-tight environment within the process chamber 14 through the junction 170 with the process chamber housing 12 in a closed configuration, as shown by FIG. 10.

Figure 11:
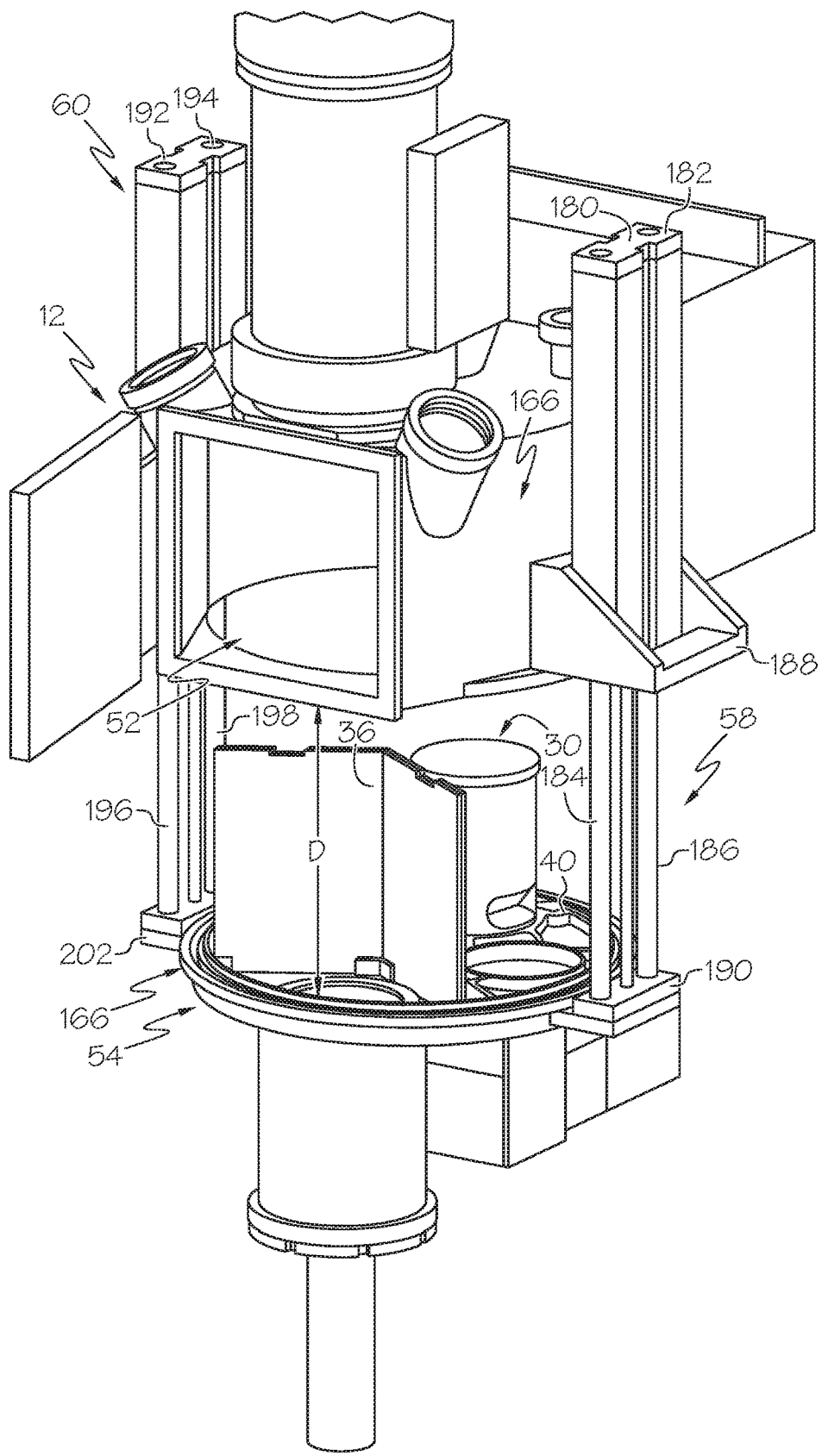
FIG. 11 is a perspective view of the additive manufacturing apparatus of FIG. 10 with the separable process chamber housing in an open configuration, according to one or more embodiments shown and described herein.

Referring to FIG. 11, the process chamber housing 12 is illustrated in an open configuration. The additive manufacturing apparatus 10 includes the first linear actuator 58 and the second linear actuator 60. The first linear actuator 58 includes a pair of cylinders 180 and 182 and a pair of rods 184 and 186 forming types of linkages, also represented by 184 and 186. The cylinders 180 and 182 are connected to the first separable process chamber housing portion 52 using a bracket 188 that is connected to the side 166 of the process chamber housing 12. The rods 184 and 186 are connected to the second separable process chamber housing portion 54 using a bracket 190 that is connected to the side 166 of the process chamber housing 12. Likewise, the second linear actuator 60 includes a pair of cylinders 192 and 194 and a pair of rods 196 and 198. The cylinders 192 and 194 are connected to the first separable process chamber housing portion 52 using a bracket (similar to bracket 188) that is connected to the side 166 of the process chamber housing 12. The rods 196 and 198 are connected to the second separable process chamber housing portion 54 using a bracket 202 that is connected to the side 166 of the process chamber housing 12.

In some embodiments, the first linear actuator 58 and the second linear actuator 60 may be gas springs. A gas spring is a type of spring that uses compressed gas contained within an enclosed cylinder sealed by a sliding piston to pneumatically store potential energy. For example, a pull-type gas spring may be used that holds the process chamber housing 12 in the closed configuration. When a tension above a predetermined level is applied to the first linear actuator 58 and the second linear actuator 60, the rods 184, 186, 196, 198 are forced to move relative to the cylinders 180, 182, 192, 194, and the gas spring assists the operator in placing the process chamber housing 12 in the open configuration. Further, the gas springs can hold the process chamber housing 12 in the open configuration until a compressive force of a predetermined amount is applied to the first linear actuator 58 and the second linear actuator 60.

It can be appreciated that providing a separable process chamber housing 12 with the first separable process chamber housing portion 52 and the second separable process chamber housing portion 54 increases spacing with the process chamber housing 12 in the open configuration compared to the closed configuration. Further, because many of the components discussed above, such as the powder storage vessel 30, rotatable support conveyor 40, build platform 24 and shield 36 travel with the second separable process chamber housing portion 54 and out of the first separable process chamber housing portion 52, added access is provided to those components. In some embodiments, the first and second linear actuators 58 and 60 may be operated automatically, e.g., using the control unit 26. For example, the first and second linear actuator 58 and 60 may be pneumatic cylinders or be motor-operated. In some embodiments, the linear actuators 58 and 60 may be sized to separate the first and second separable process chamber housing portions a distance D of at least about 80 mm, such as a distance of at least about 100 mm, such as a distance of at least about 150 mm, such as a distance of at least about 200 mm, such as a distance of at least about 250 mm, such as a distance of at least about 300 mm. In some embodiments, the distance D may be about a height of the process chamber 14 or more.

Figure 12:
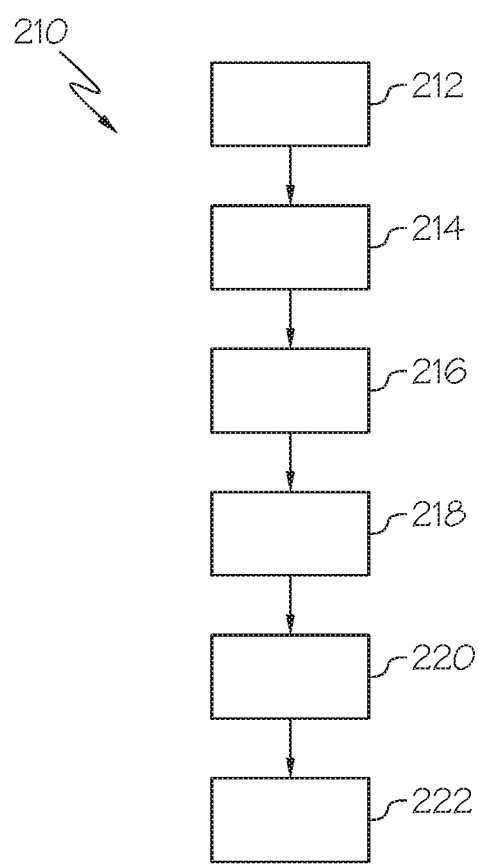
FIG. 12 is a method of operating the additive manufacturing apparatus of FIG. 1, according to one or more embodiments shown and described herein.

Referring to FIG. 12, a method 210 of operating the additive manufacturing apparatus 10 is represented. The method 210 includes placing the powder storage vessel 30 into the process chamber 14 with the powder storage vessel 30 in the closed configuration so that powder material does not exit the powder storage vessel 30 at step 212. At step 214, the tabs 148 and 150 of the bottom cap 80 are aligned with and inserted into the tab receiving recesses 144 and 146 of the cavity structure 110 of the rotatable support conveyor 40. With the bottom cap 80 held in place by the tabs 148 and 150 in the tab receiving recesses 144 and 146, the vessel body 70 is rotated relative to the bottom cap 80 until the ends 140 and 142 of the dowel rod 140 are received by the clip portions 136 and 138 of the clips 132 and 134 thereby aligning the powder delivery slots 90, 92, 94 and 96 and also aligning the powder delivery slots 90, 92, 94 and 96 with the slot 120 through the rotatable support conveyor 40 at step 216. At step 218, powder material is delivered to the space 154 beneath the rotatable support conveyor 40 and adjacent the powder distributor 29. The powder distributor 29 then rakes the powder material onto the build platform 24.

After a three-dimensional structure is built, as described above, it may be desirable to clean or otherwise access the process chamber 14. At step 220, an operator may grasp one or both of the first and second separable process chamber housing portions 52 and 54 and pull one away from the other providing a tensioning force to the first linear actuator 58 and the second linear actuator 60. The tensioning force may cause the process chamber housing 12 to move into the open configuration at step 222. The first and second separable process chamber housing portions 52 and 54 may then be held in the open configuration until a compressive force is applied to the first linear actuator 58 and the second linear actuator 60 thereby causing the process chamber housing to move into the closed configuration.

The above-described additive manufacturing apparatuses include process chamber housings that include separable process chamber housing portions that separate at a junction to provide a closed configuration and an open configuration. In the closed configuration, the additive manufacturing apparatuses may be operated to build a three-dimensional structure. In the open configuration, the separable process chamber housing portions are separated to provide access spacing through which the process chamber can be more readily accessed for a variety of reasons, such as for cleaning or to replace a powder storage vessel. A guide member may be provided in order to maintain a connection between the separable housing portions, even when in the open configuration. The guide member may be manually, partially manually and/or automatically operated.

Further aspects of the invention are provided by the subject matter of the following clauses:

1. An additive manufacturing apparatus for forming a three-dimensional article through successive fusion of parts of layers of a powder material, which parts correspond to successive cross-sections of the three-dimensional article, the additive manufacturing apparatus comprising: a process chamber housing enclosing a process chamber, the process chamber housing comprising a first separable process chamber housing portion and a second separable process chamber housing portion, the first separable process chamber housing portion comprising a top of the process chamber housing and the second separable process chamber housing portion comprising a bottom of the process chamber housing, wherein the first separable process chamber housing portion meets the second separable process chamber housing portion at a junction that extends about a periphery of the process chamber housing portion in a closed configuration; wherein the process chamber housing has an open configuration where the first separable process housing portion and the second separable process housing portion are separated to provide an access spacing between the first separable housing portion and the second separable housing portion.

2. The additive manufacturing apparatus of any preceding clause further comprising a guide member coupled to the first separable process chamber housing portion and the second separable process chamber housing portion, wherein the guide member selectively maintains the access spacing between the first separable process chamber housing portion and the second separable process chamber housing portion in an open configuration.

3. The additive manufacturing apparatus of any preceding clause, wherein the guide member comprises a cylinder connected to one of the first separable process chamber housing portion and the second separable process chamber housing portion and a rod connected to the other of the first separable process chamber housing portion and the second separable process chamber housing portion.

4. The additive manufacturing apparatus of any preceding clause further comprising a seal between the first separable process chamber housing portion and the second separable process chamber housing portion.

5. The additive manufacturing apparatus of any preceding clause further comprising a rotatable support conveyor rotatably connected to the second separable process chamber housing portion.

6. The additive manufacturing apparatus of any preceding clause further comprising a build platform supported by the second separable process chamber housing portion, wherein the build platform is moveable with respect to the second separable process chamber housing portion.

7. The additive manufacturing apparatus of any preceding clause, wherein the access spacing between the first separable process chamber housing portion and the second separable process chamber housing portion is at least a height of the process chamber.

8. The additive manufacturing apparatus of any preceding clause, wherein the access spacing between the first separable process chamber housing portion and the second separable process chamber housing portion is at least about 200 mm.

9. The additive manufacturing apparatus of any preceding clause further comprising an energy beam source arranged for at least one of heating or fusing a powder material located on a build platform supported by the second separable process housing portion.

10. A process chamber housing for an additive manufacturing apparatus for forming a three-dimensional article through successive fusion of parts of layers of a powder material, which parts correspond to successive cross-sections of the three-dimensional article, the process chamber housing comprising: a first separable process chamber housing portion and a second separable process chamber housing portion, the first separable process chamber housing portion comprising a top of the process chamber housing and the second separable process chamber housing portion comprising a bottom of the process chamber housing, wherein the first separable process chamber housing portion meets the second separable process chamber housing portion at a junction that extends about a periphery of the process chamber housing portion in a closed configuration; wherein the process chamber housing has an open configuration where the first separable process housing portion and the second separable process housing portion are separated to provide an access spacing between the first separable housing portion and the second separable housing portion 11. The process chamber housing of any preceding clause further comprising a guide member coupled to the first separable process chamber housing portion and the second separable process chamber housing portion, wherein the guide member selectively maintains the access spacing between the first separable process chamber housing portion and the second separable process chamber housing portion.

12. The process chamber housing of any preceding clause, wherein the guide member comprises a cylinder connected to one of the first separable process chamber housing portion and the second separable process chamber housing portion and a rod connected to the other of the first separable process chamber housing portion and the second separable process chamber housing portion.

13. The process chamber housing of any preceding clause further comprising a seal between the first separable process chamber housing portion and the second separable process chamber housing portion.

14. The process chamber housing of any preceding clause, wherein the guide member provides a distance between the first separable process chamber housing portion and the second separable process chamber housing portion that is at least a height of a process chamber.

15. The process chamber housing of any preceding clause, wherein the access spacing between the first separable process chamber housing portion and the second separable process chamber housing portion is at least about 200 mm.

16. A method of accessing a process chamber of an additive manufacturing apparatus, the method comprising: building a three-dimensional article on a build platform within a process chamber of a process chamber housing through successive fusion of parts of layers of a powder material, which parts correspond to successive cross-sections of the three-dimensional article; and separating a first separable process chamber housing portion and a second separable process chamber housing portion of the process chamber at a junction that extends about a periphery of the process chamber housing to provide an access spacing between the first separable process chamber housing and the second separable process chamber housing and thereby place the process chamber housing in an open configuration, the first separable process chamber housing portion including a top of the process chamber housing and the second separable process chamber housing portion including a bottom of the process chamber housing.

17. The method of any preceding clause, wherein a guide member separates the first separable process chamber housing portion and the second separable process chamber housing portion at the junction.

18. The method of any preceding clause, wherein the guide member comprises a gas spring.

19. The method of any preceding clause, wherein the step of separating comprises applying a tension force to the gas spring manually.

20. The method of any preceding clause further comprising the guide member holding the process chamber housing in the open configuration.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An additive manufacturing apparatus for forming a three-dimensional article through successive fusion of parts of layers of a powder material, which parts correspond to successive cross-sections of the three-dimensional article, the additive manufacturing apparatus comprising:
a process chamber housing enclosing a process chamber, the process chamber housing comprising a first separable process chamber housing portion and a second separable process chamber housing portion, the first separable process chamber housing portion comprising a top of the process chamber housing and the second separable process chamber housing portion comprising a bottom of the process chamber housing, wherein the first separable process chamber housing portion meets the second separable process chamber housing portion at a junction that extends about an entire periphery of the process chamber housing in a closed configuration;
a powder storage vessel in the second separable process chamber housing portion and contained within the process chamber housing with the process chamber housing in the closed configuration; and
a rotatable support conveyor rotatably connected to the second separable process chamber housing portion, the rotatable support conveyor comprising a cavity structure that is configured to receive a bottom of the powder storage vessel;
wherein the process chamber housing has an open configuration where the first separable process chamber housing portion and the second separable process chamber housing portion are separated to provide an access spacing between the first separable process chamber housing portion and the second separable process chamber housing portion and around the entire periphery of the process chamber housing of a predetermined distance while remaining connected together thereby exposing the powder storage vessel between the first separable process chamber housing portion and the second separable process chamber housing portion;
wherein the first separable process chamber housing portion is located entirely above the powder storage vessel in the open configuration such that the powder storage vessel is removable from opposite sides of the cavity structure regardless of a rotational position of the rotatable support conveyor.

2. The additive manufacturing apparatus of claim 1 further comprising a guide member comprising a linkage coupled to the first separable process chamber housing portion and the second separable process chamber housing portion, wherein the guide member selectively maintains the access spacing between the first separable process chamber housing portion and the second separable process chamber housing portion in the open configuration.

3. The additive manufacturing apparatus of claim 2, wherein the linkage of the guide member comprises a cylinder connected to one of the first separable process chamber housing portion and the second separable process chamber housing portion and a rod connected to the other of the first separable process chamber housing portion and the second separable process chamber housing portion.

4. The additive manufacturing apparatus of claim 1 further comprising a seal between the first separable process chamber housing portion and the second separable process chamber housing portion.

5. The additive manufacturing apparatus of claim 1 further comprising a build platform supported by the second separable process chamber housing portion, wherein the build platform is moveable with respect to the second separable process chamber housing portion.

6. The additive manufacturing apparatus of claim 1, wherein the access spacing between the first separable process chamber housing portion and the second separable process chamber housing portion is at least a height of the process chamber.

7. The additive manufacturing apparatus of claim 1, wherein the access spacing between the first separable process chamber housing portion and the second separable process chamber housing portion is at least about 200 mm.

8. The additive manufacturing apparatus of claim 1 further comprising an energy beam source comprising an electron beam gun configured to produce an energy beam and arranged for at least one of heating or fusing a powder material located on a build platform supported by the second separable process chamber housing portion.

9. A process chamber housing for an additive manufacturing apparatus for forming a three-dimensional article through successive fusion of parts of layers of a powder material, which parts correspond to successive cross-sections of the three-dimensional article, the process chamber housing comprising:
- a first separable process chamber housing portion and a second separable process chamber housing portion, the first separable process chamber housing portion comprising a top of the process chamber housing and the second separable process chamber housing portion comprising a bottom of the process chamber housing, wherein the first separable process chamber housing portion meets the second separable process chamber housing portion at a junction that extends about an entire periphery of the process chamber housing in a closed configuration;
- a powder storage vessel in the second separable process chamber housing portion and contained within the process chamber housing with the process chamber housing in the closed configuration; and
- a rotatable support conveyor rotatably connected to the second separable process chamber housing portion, the rotatable support conveyor comprising a cavity structure that is configured to receive a bottom of the powder storage vessel;
- wherein the process chamber housing has an open configuration where the first separable process chamber housing portion and the second separable process chamber housing portion are separated to provide an access spacing between the first separable process chamber housing portion and the second separable process chamber housing portion and around the entire periphery of the process chamber housing of a predetermined distance while remaining connected together thereby exposing the powder storage vessel between the first separable process chamber housing portion and the second separable process chamber housing portion;
- wherein the first separable process chamber housing portion is located entirely above the powder storage vessel in the open configuration such that the powder storage vessel is removable from opposite sides of the cavity structure regardless of a rotational position of the rotatable support conveyor.

10. The process chamber housing of claim 9 further comprising a guide member comprising a linkage coupled to the first separable process chamber housing portion and the second separable process chamber housing portion, wherein the guide member selectively maintains the access spacing between the first separable process chamber housing portion and the second separable process chamber housing portion.

11. The process chamber housing of claim 10, wherein the linkage of the guide member comprises a cylinder connected to one of the first separable process chamber housing portion and the second separable process chamber housing portion and a rod connected to the other of the first separable process chamber housing portion and the second separable process chamber housing portion.

12. The process chamber housing of claim 10, wherein the guide member provides a distance between the first separable process chamber housing portion and the second separable process chamber housing portion that is at least a height of a process chamber.

13. The process chamber housing of claim 9, further comprising a seal between the first separable process chamber housing portion and the second separable process chamber housing portion.

14. The process chamber housing of claim 9, wherein the access spacing between the first separable process chamber housing portion and the second separable process chamber housing portion is at least about 200 mm.

15. A method of accessing a process chamber of an additive manufacturing apparatus, the method comprising:
- building a three-dimensional article on a build platform within the process chamber of a process chamber housing through successive fusion of parts of layers of a powder material, which parts correspond to successive cross-sections of the three-dimensional article;
- separating a first separable process chamber housing portion and a second separable process chamber housing portion of the process chamber housing at a junction that extends about an entire periphery of the process chamber housing to provide an access spacing between the first separable process chamber housing portion and the second separable process chamber housing portion and thereby place the process chamber housing in an open configuration with the first separable process chamber housing portion located entirely above a powder storage vessel in the open configuration with the first separable process chamber housing portion remaining connected to the second separable process chamber housing portion, the first separable process chamber housing portion including a top of the process chamber housing and the second separable process chamber housing portion including a bottom of the process chamber housing;
- wherein the step of separating includes exposing the powder storage vessel between the first separable process chamber housing portion and the second separable process chamber housing portion, the powder storage vessel in the second separable process chamber housing portion and contained within the process chamber housing with the process chamber housing in a closed configuration; and
- removing the powder storage vessel from a cavity structure of a rotatable support conveyor rotatably connected to the second separable process chamber housing portion, the cavity structure configured to receive a bottom of the powder storage vessel;
- wherein the first separable process chamber housing portion located entirely above the powder storage vessel in the open configuration such that the powder storage vessel is removable from opposite sides of the cavity structure regardless of a rotational position of the rotatable support conveyor.

16. The method of claim 15, wherein a guide member separates the first separable process chamber housing portion and the second separable process chamber housing portion at the junction.

17. The method of claim 16, wherein the guide member comprises a gas spring.

18. The method of claim 17, wherein the step of separating comprises applying a tension force to the gas spring manually.

19. The method of claim 16 further comprising the guide member holding the process chamber housing in the open configuration.

* * * * *